(12) United States Patent
Sreeram et al.

(10) Patent No.: US 10,208,764 B2
(45) Date of Patent: Feb. 19, 2019

(54) ROTOR WHEEL AND IMPELLER INSERTS

(71) Applicant: General Electric Company, Schenectady, NY (US)

(72) Inventors: Kiran Sreeram, Greenville, SC (US); John Herbert Dimmick, III, Greenville, SC (US); Gary Charles Liotta, Greenville, SC (US); John Robert Sech, Greenville, SC (US); Eric Richard Bonini, Greenville, SC (US); Patrick Shawn Reilly, Greenville, SC (US)

(73) Assignee: General Electric Company, Schenectady, NY (US)

( * ) Notice: Subject to any disclaimer, the term of this patent is extended or adjusted under 35 U.S.C. 154(b) by 381 days.

(21) Appl. No.: 15/052,973

(22) Filed: Feb. 25, 2016

(65) Prior Publication Data
US 2017/0248152 A1  Aug. 31, 2017

(51) Int. Cl.
*F04D 29/32* (2006.01)
*F04D 29/64* (2006.01)
(Continued)

(52) U.S. Cl.
CPC ......... *F04D 29/322* (2013.01); *F01D 5/046* (2013.01); *F01D 5/048* (2013.01); *F01D 5/087* (2013.01);
(Continued)

(58) Field of Classification Search
CPC .... F04D 29/322; F04D 29/522; F04D 29/644; F01D 5/046; F01D 5/048; F01D 5/087; F01D 5/187; F01D 5/188; F01D 25/12; F01D 5/082; F01D 5/081; F01D 5/303; F01D 5/3015; F05D 2220/32; F05D 2230/10; F05D 2230/232; F05D 2260/30; F05D 2260/60
See application file for complete search history.

(56) References Cited

U.S. PATENT DOCUMENTS 5,472,313 A * 12/1995 Quinones ............... F01D 5/082
                                                              415/115
6,361,277 B1 * 3/2002 Bulman .................. F01D 5/082
                                                              416/198 A (Continued)

FOREIGN PATENT DOCUMENTS

DE  10 2011 051 388 A1  1/2012
EP       2 679 771 A1   1/2014

OTHER PUBLICATIONS

Extended European Search Report issued in connection with corresponding EP Application No. 17156984.1 dated Jun. 28, 2017.

*Primary Examiner* — Logan Kraft
*Assistant Examiner* — Eric Zamora Alvarez
(74) *Attorney, Agent, or Firm* — Mark E. Henderson; Ernest G. Cusick; Frank A. Landgraff

(57) ABSTRACT

A rotor wheel for an engine includes a plurality of impeller vanes and a plurality of fluid passages defined by adjacent impeller vanes. The fluid passages are radially disposed across at least a portion of the rotor wheel. One or more impeller inserts may be disposed within one or more of the plurality of fluid passages, respectively. The impeller inserts define an impeller passage with a passage shape that controls a flow of fluid through the one or more of the plurality of fluid passages.

18 Claims, 18 Drawing Sheets

(51) Int. Cl.
   *F04D 29/52* (2006.01)
   *F01D 5/08* (2006.01)
   *F01D 5/04* (2006.01)
   *F01D 25/12* (2006.01)
   *F01D 5/18* (2006.01)

(52) U.S. Cl.
   CPC ............ *F01D 5/187* (2013.01); *F01D 5/188* (2013.01); *F01D 25/12* (2013.01); *F04D 29/522* (2013.01); *F04D 29/644* (2013.01); *F05D 2220/32* (2013.01); *F05D 2230/10* (2013.01); *F05D 2230/232* (2013.01); *F05D 2260/30* (2013.01); *F05D 2260/60* (2013.01); *Y02T 50/671* (2013.01); *Y02T 50/673* (2013.01); *Y02T 50/676* (2013.01)

(56) References Cited

U.S. PATENT DOCUMENTS

| | | | |
|---|---|---|---|
| 6,773,225 B2 * | 8/2004 | Yuri | F01D 5/08 415/1 |
| 7,001,148 B2 | 2/2006 | Cardenas et al. | |
| 8,348,599 B2 * | 1/2013 | Chiu | F04D 29/321 415/115 |
| 8,408,873 B2 * | 4/2013 | Iwasa | B23K 26/206 29/525.14 |
| 2012/0003091 A1 | 1/2012 | Segovia | |
| 2013/0343868 A1 * | 12/2013 | Jha | F01D 5/087 415/1 |
| 2014/0010606 A1 * | 1/2014 | Sagstrom | B23C 5/08 407/51 |
| 2014/0255145 A1 | 9/2014 | Miranda et al. | |

* cited by examiner

ROTOR WHEEL AND IMPELLER INSERTS

BACKGROUND OF THE INVENTION

The invention relates to air flow in an engine rotor and, more particularly, to an impeller insert/plug between the flanges for use in aircraft or gas turbine engines.

Gas turbines are widely used in industrial and commercial operations. A typical gas turbine includes a compressor at the front, one or more combustors around the middle, and a turbine at the rear. The compressor imparts kinetic energy to the working fluid (e.g., air) to produce a compressed working fluid at a highly energized state. The compressed working fluid exits the compressor and flows to the combustors where it mixes with fuel and ignites to generate combustion gases having a high temperature and pressure. The combustion gases flow to the turbine where they expand to produce work. For example, expansion of the combustion gases in the turbine may rotate a shaft connected to a generator to produce electricity.

The compressor and the turbine typically share a common rotor which extends from near the front of the compressor, through the combustor section, to near the rear of the turbine. The rotor typically is configured to direct a portion of the working fluid through one or more cooling flow passages to cool various components of the gas turbine.

In a gas turbine engine, air is extracted from the flow path into the rotor through flanges. This air is then directed to the turbine to cool the turbine airfoils. In a typical configuration, an impeller/slot is located between the two wheel flanges through which the air passes from rim to bore. Impeller definition/geometry itself is governed by the flow and pressures that are required.

BRIEF SUMMARY OF THE INVENTION

In an exemplary embodiment, a rotor wheel for an engine includes a plurality of impeller vanes and a plurality of fluid passages defined by adjacent impeller vanes. The fluid passages are radially disposed across at least a portion of the rotor wheel. One or more impeller inserts are disposed within one or more of the plurality of fluid passages, respectively. The impeller inserts define an impeller passage with a passage shape that controls a flow of fluid through the one or more of the plurality of fluid passages.

In another exemplary embodiment, an impeller insert for a rotor wheel in an engine is shaped to fit within one or more of the fluid passages and includes an impeller passage having a passage shape that controls a flow of fluid through the one or more of the plurality of fluid passages.

In yet another exemplary embodiment, a method of tuning fluid flow across a rotor wheel in an engine includes the steps of positioning one or more impeller inserts within one or more of the plurality of fluid passages, respectively; defining an impeller passage in the impeller inserts with a passage shape that controls a flow of fluid through the one or more of the plurality of fluid passages.

DETAILED DESCRIPTION OF THE INVENTION

Figure 1:
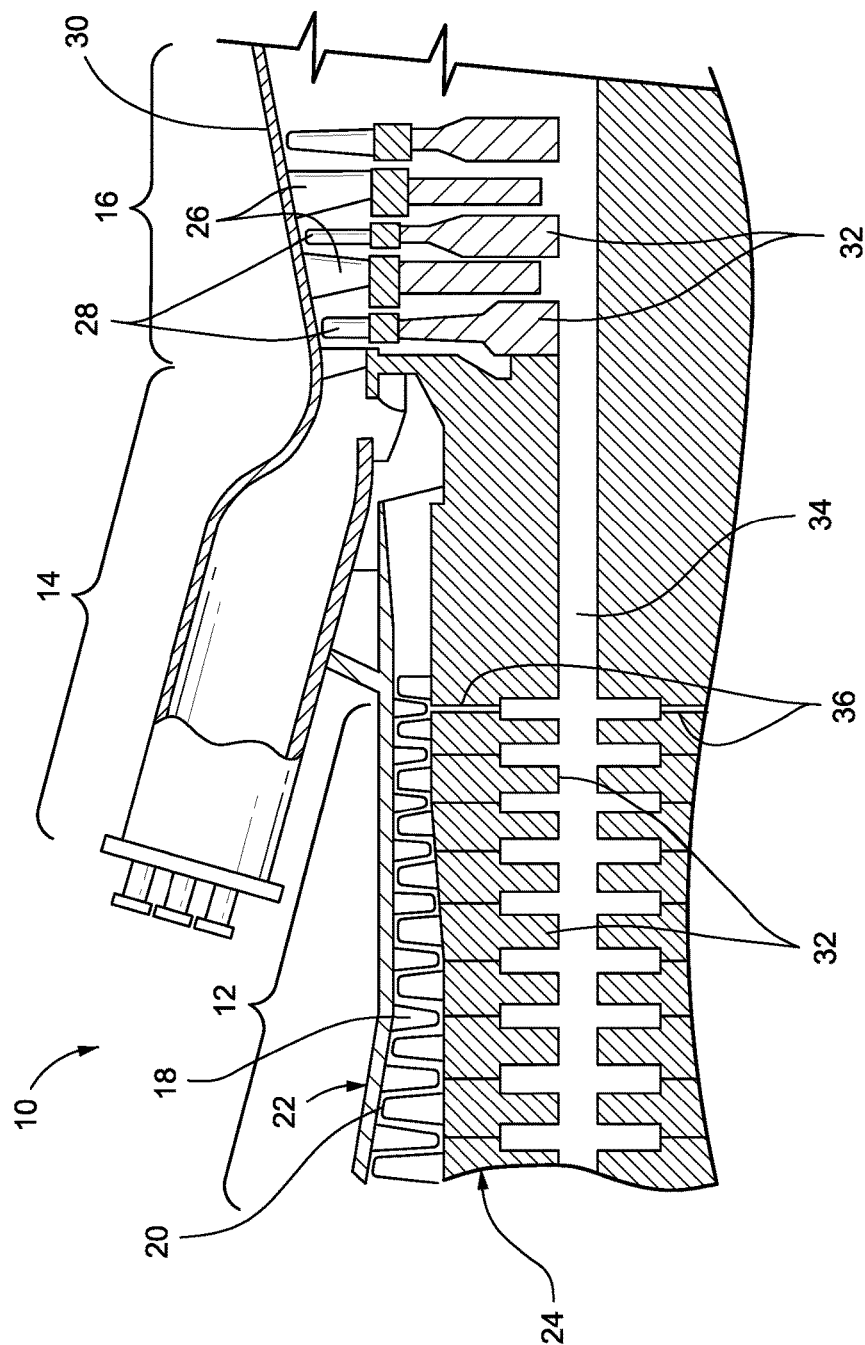
FIG. 1 is a cross-sectional view of an exemplary gas turbine.

FIG. 1 is a cross-sectional view of an exemplary gas turbine 10 to illustrate various embodiments herein. As shown, the gas turbine 10 may generally include a compressor 12, one or more combustors 14 downstream from the compressor 12, and a turbine 16 downstream from the combustors 14. The compressor 12 may generally include alternating stages of axially aligned stator vanes 18 and rotating blades 20. The stator vanes 18 may be circumferentially connected to a compressor casing 22, and the rotating blades 20 may be circumferentially connected to a rotor 24. As the rotor 24 turns, the stator vanes 18 and rotating blades 20 may progressively impart kinetic energy to a working fluid (e.g., air) to produce a compressed working fluid at a highly energized state. The compressed working fluid may then flow to one or more combustors 14 radially arranged around the rotor 24 where it may mix with fuel and ignites to produce combustion gases having a high temperature and pressure. The combustion gases may exit the combustors 14 and flow along a hot gas path through the turbine 16. The turbine 16 may include alternating stages of axially aligned stator vanes 26 and rotating buckets 28. The stator vanes 26 may be circumferentially connected to a turbine casing 30, and the rotating buckets 28 may be circumferentially connected to the rotor 24. Each stage of stator vanes 26 may direct and accelerate the combustion gases onto the downstream stage of rotating buckets 28 to produce work.

As depicted in FIG. 1, the rotor 24 may include a number of rotor bodies or wheels 32 axially aligned and connected to transmit torque between the turbine 16 and the compressor 12. Each rotor body or wheel 32 may include one or more cavities that form an axial bore 34 through the rotor 24. One or more of the adjacent rotor wheels 32 may include a fluid passage 36 that provides fluid communication between the compressor 12 and the bore 34. In this manner, a portion of the compressed working fluid from the compressor 12 may be diverted around or bypass the combustors 14 and supplied directly to the turbine 16 for various reasons. For example, the diverted fluid may be used to pressurize the rotor cavities to produce a desired differential pressure between the rotor cavities and the hot gas path in the turbine 16. Alternately, or in addition, the diverted fluid may be used to provide cooling to various components in the turbine 16.

Figure 2:
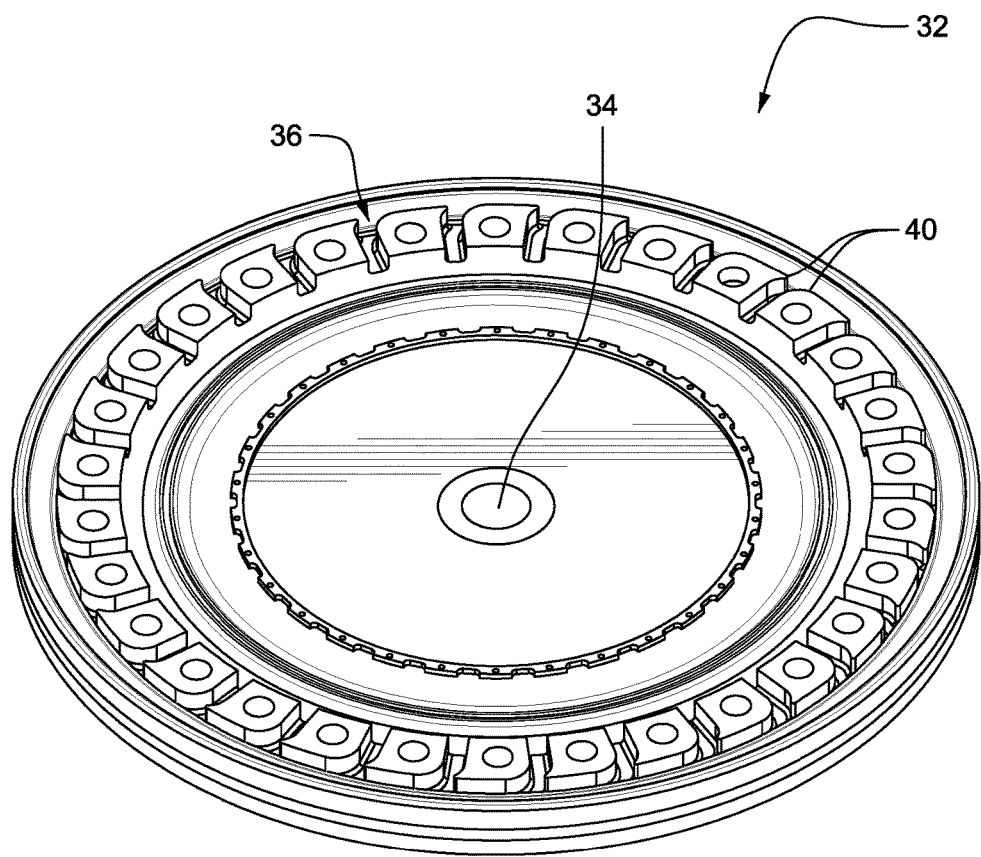
FIG. 2 is a perspective view of a rotor wheel.

FIG. 2 depicts a perspective view of the rotor wheel 32 according to one embodiment. The outer circumference of the rotor wheel 32 may include a number of dovetail slots configured to receive the rotating blades 20. In addition, the radial face of the rotor wheel 32 may include one or more projections or impeller vanes 40 radially disposed on the rotor wheel 32. Adjacent projections or impeller vanes 40 on the surface of the rotor wheel 32 may define slots or fluid passages 36 radially across the rotor wheel 32. The impeller vanes 40 may divert a portion of the compressed working fluid through the fluid passages 36 to the bore 34.

Figure 3:
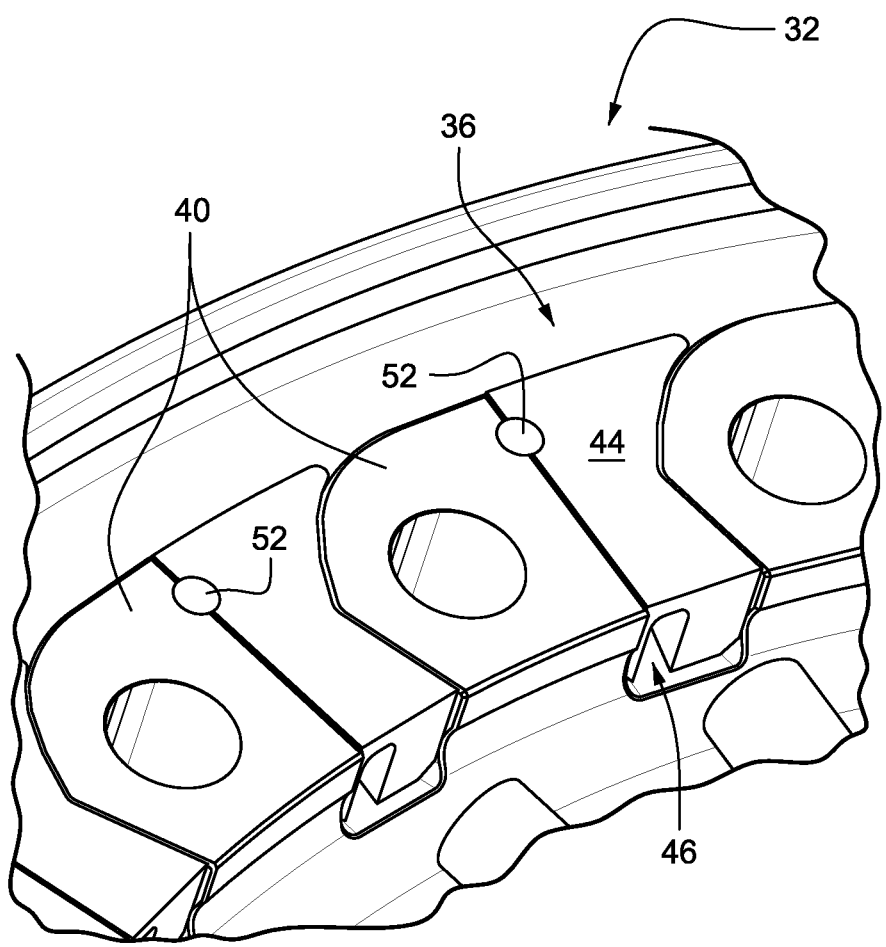
FIG. 3 shows a rotor wheel including exemplary impeller inserts installed in the rotor wheel fluid passages/slots.

FIG. 3 is a close-up view showing impeller inserts 44 positioned within the fluid passages 36 defined by the impeller vanes 40. The impeller inserts 44 define an impeller passage 46 with a passage shape that controls a flow of fluid through the fluid passages 36. In the exemplary inserts 44 shown in FIG. 3, the impeller passage 46 is narrower than the fluid passages 36 between adjacent ones of the impeller vanes 40.

Figure 4:
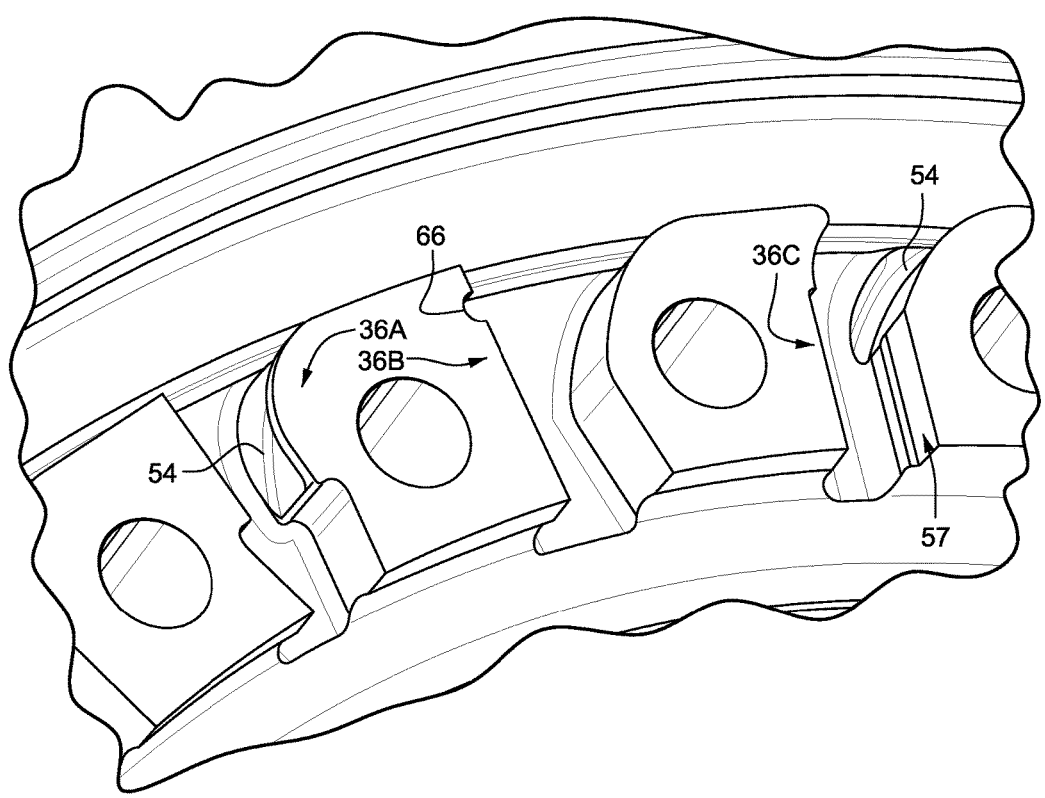
FIG. 4 shows exemplary slot configurations of the described embodiments.

FIGS. 4-12 show exemplary configurations for the impeller inserts 44. In FIG. 4, the slots 36 are re-machined to be wider and deeper. FIG. 4 shows three different slot configurations for different insert types/shapes. A first slot 36A is machined into a dovetail shape for securing a correspondingly shaped insert. A portion of the impeller slot profile 54 is machined into the wheel. A second slot 36B includes a groove 66 that is cooperable with a groove 50 in the insert for receiving a pin 52, which may be a solid pin, spring pin, set screw or the like (see FIG. 5). The inserts 44 may alternatively be secured between two stages with bolts on either side. The inserts 44 may thus be radially constrained by mechanical means (dovetail, pin, etc.) or by some mechanical means and a friction component from the flange load. A third exemplary slot 36C is machined to include a weld slot 57 for receiving a weld material in cooperation with a weld slot 58 in the insert (see FIGS. 5 and 10).

Exemplary impeller inserts 44 include a dovetail insert 44A, a pin-secured insert 44B, and a welded insert 44C. The dovetail insert 44A is secured in a dovetail 48 formed in the first fluid passage 36A. The dovetail 48 is preferably defined by milling the dovetail shape from existing fluid passages. The pin-secured insert 44B is secured with a notch 50 in the insert 44B that receives a pin 52. The section 54 of the fluid passage may be milled to accommodate the desired shape of the impeller insert 44B.

Figure 5:
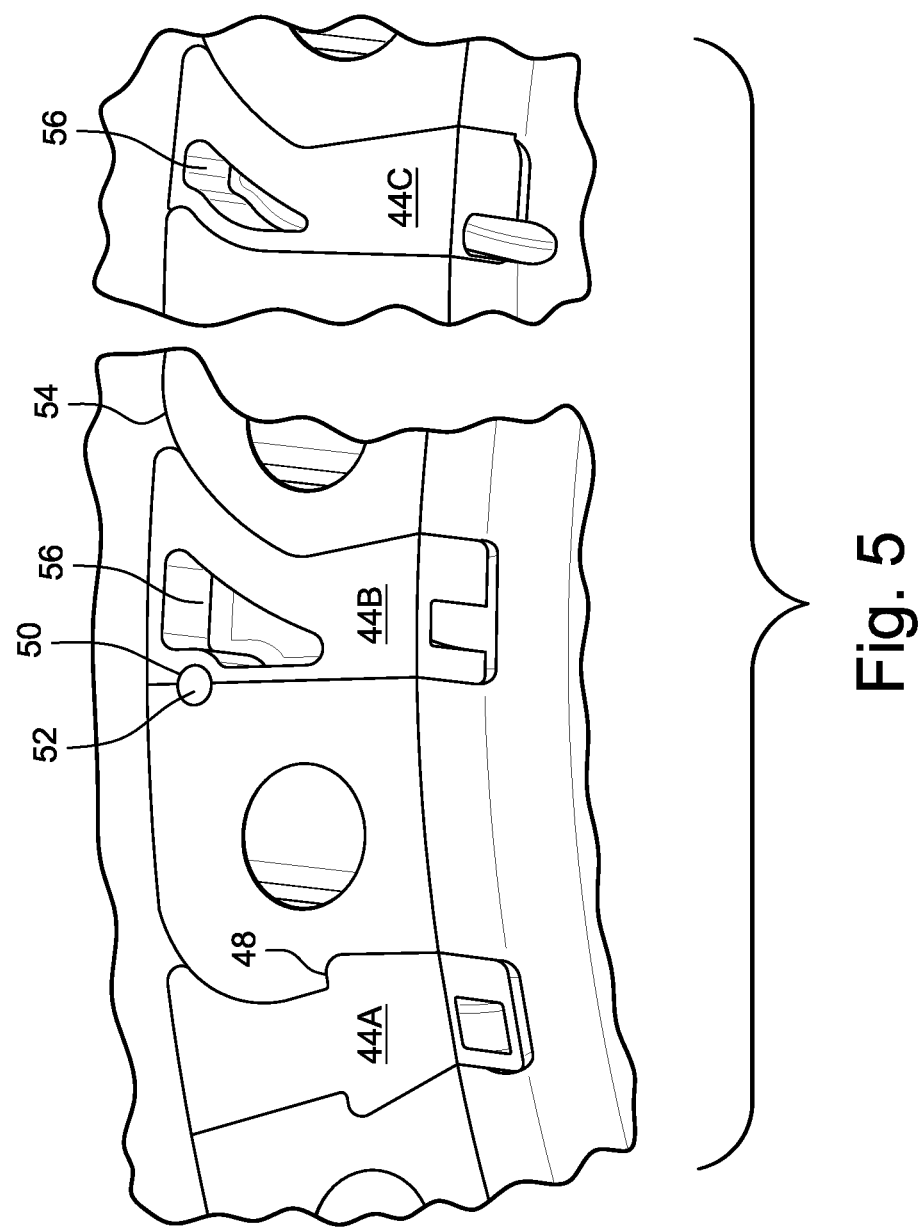
FIG. 5 shows exemplary impeller inserts secured in the exemplary slots of FIG. 4.

As shown in FIG. 5, the pin-secured insert 44B includes a pocket or hole 56, which may be milled from the insert after forming the profile by wire EDM. The pocket or hole 56 serves to reduce the amount of material used for the inserts and thereby reduce the weight of the inserts.

Figure 12:
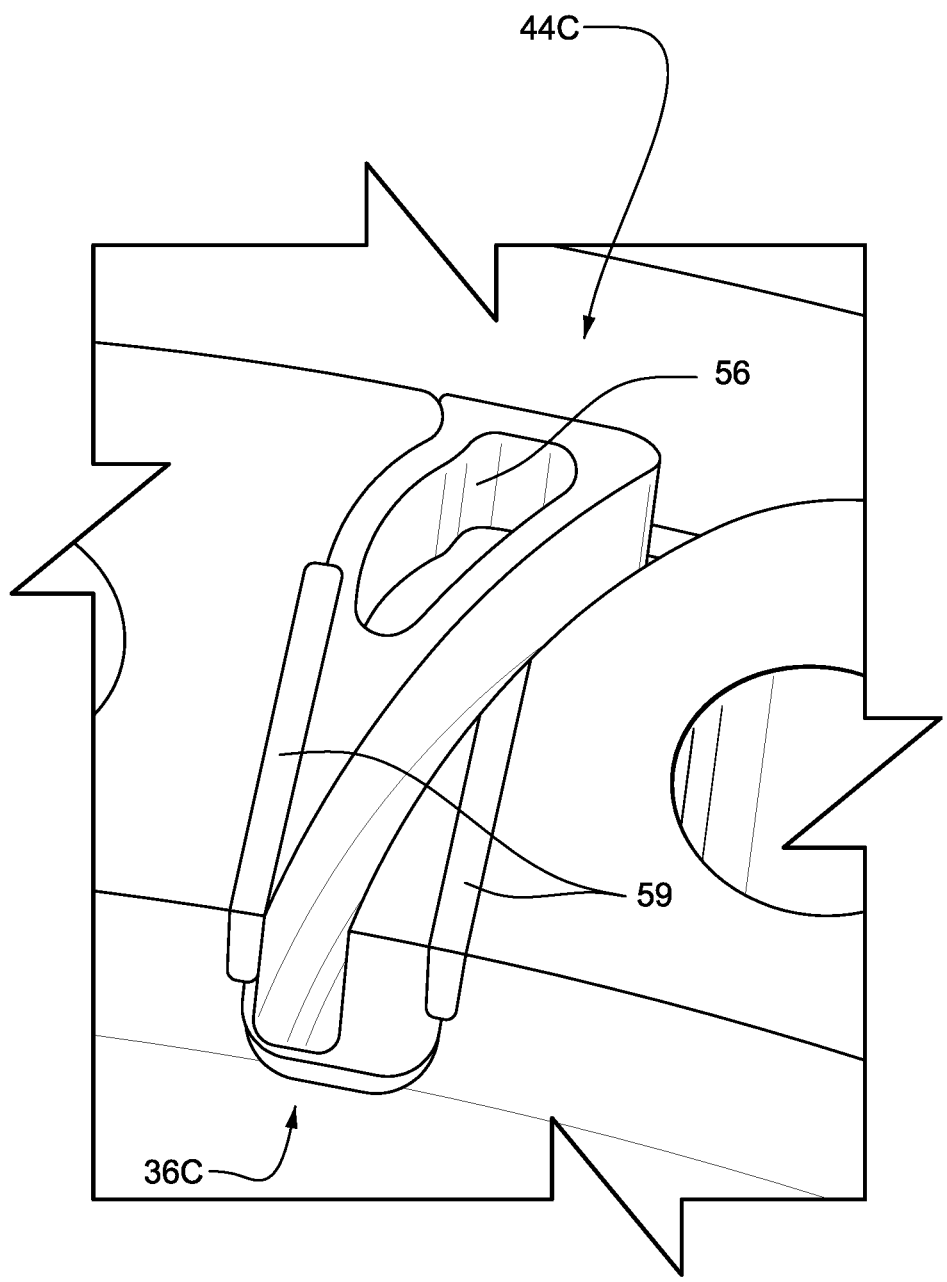
FIG. 12 shows a welded impeller insert installed in a rotor wheel fluid passage/slot.

The welded insert 44C may similarly include a pocket or hole 56 and is also provided with the weld slot 58 for receiving weld material 59 to secure the insert in place. FIG. 12 shows a welded insert installed in the third fluid passage/slot 36C.

Figure 13:
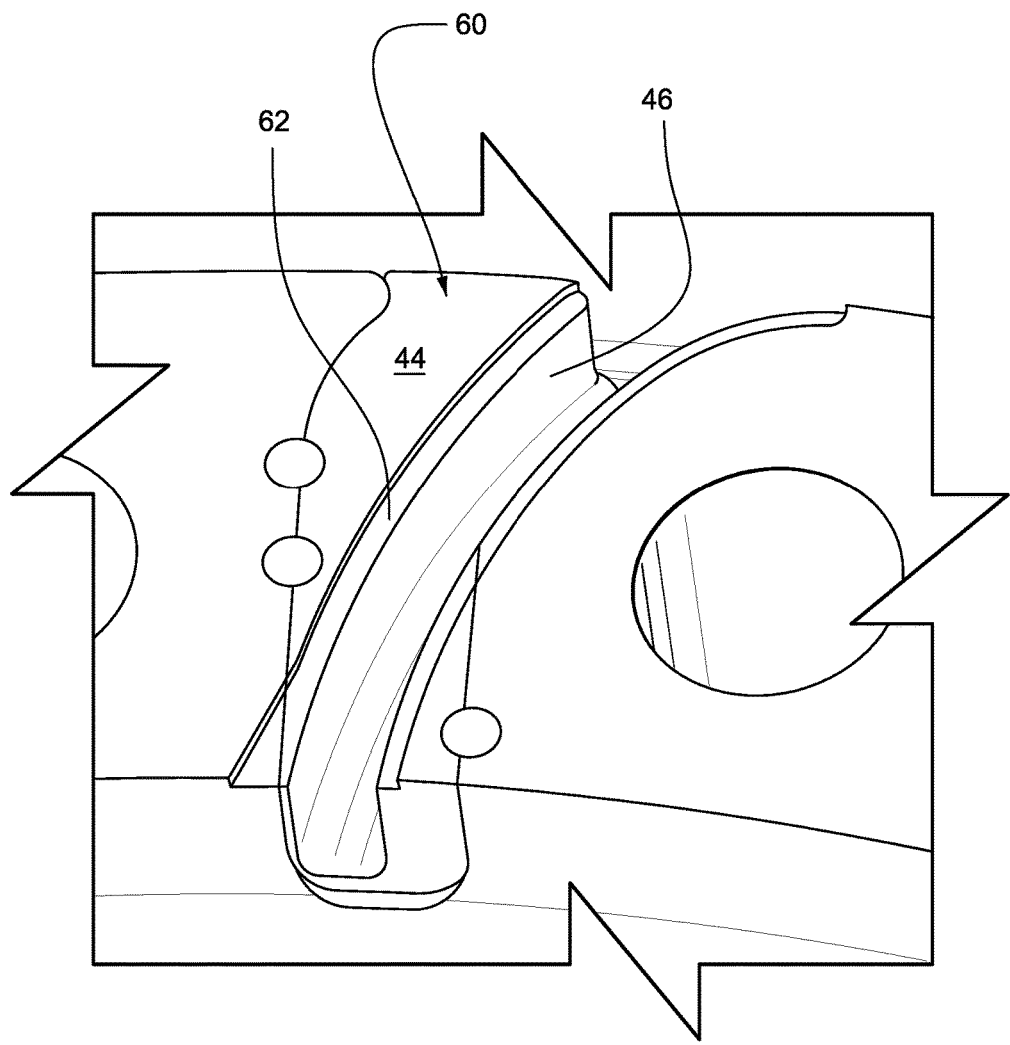
FIGS. 13-15 show process steps for installing an exemplary insert.
Figure 14:
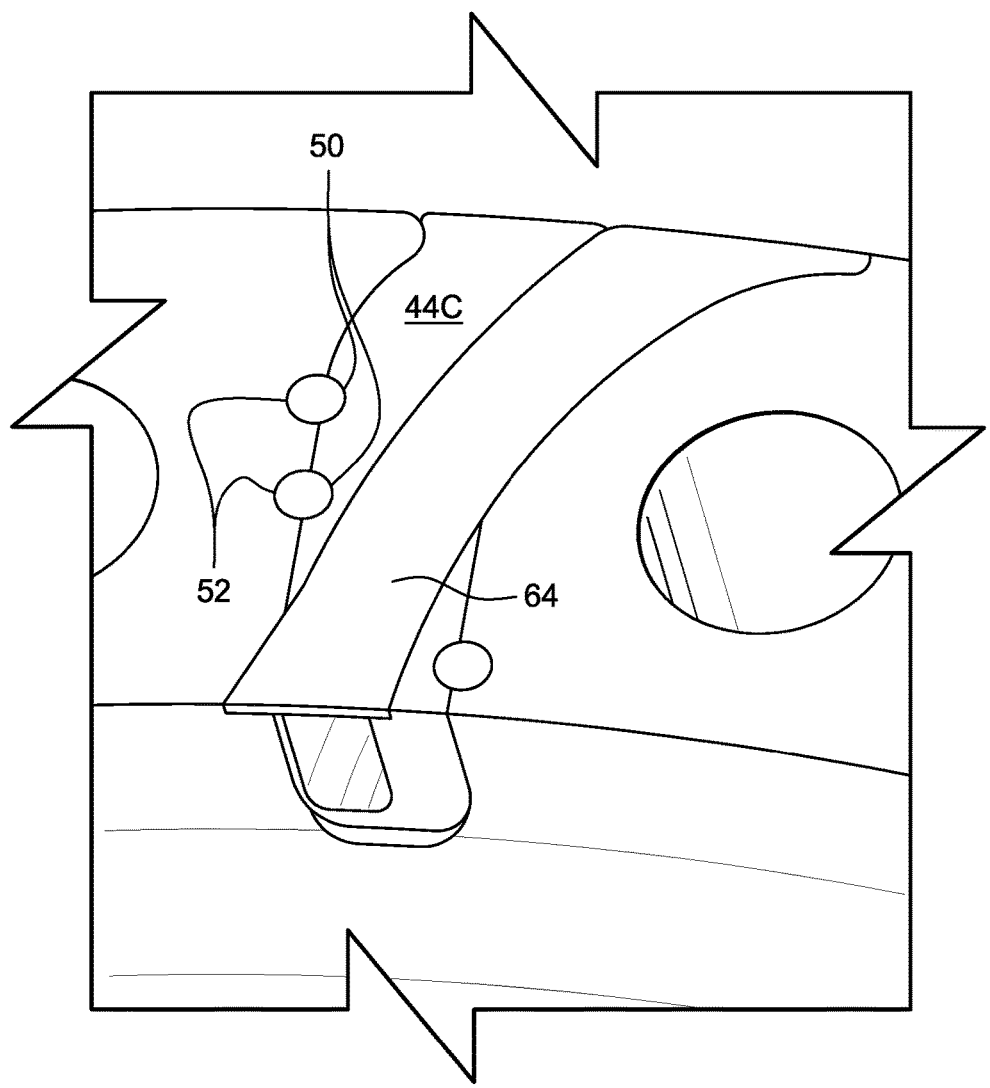
Figure 15:
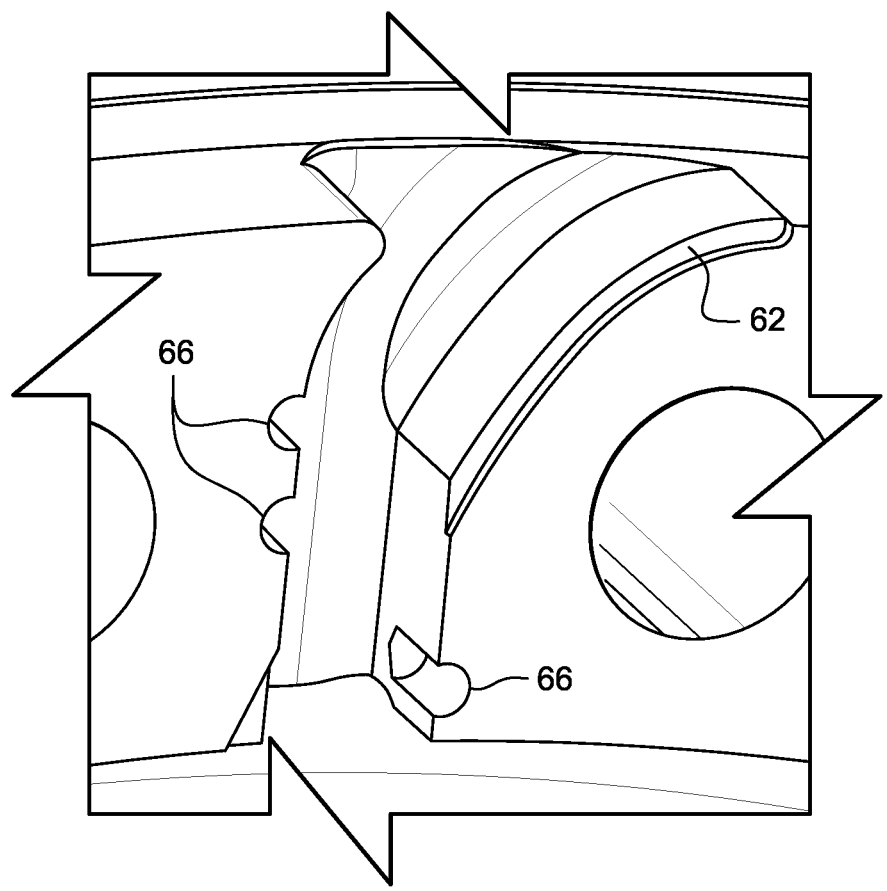
Figure 16:
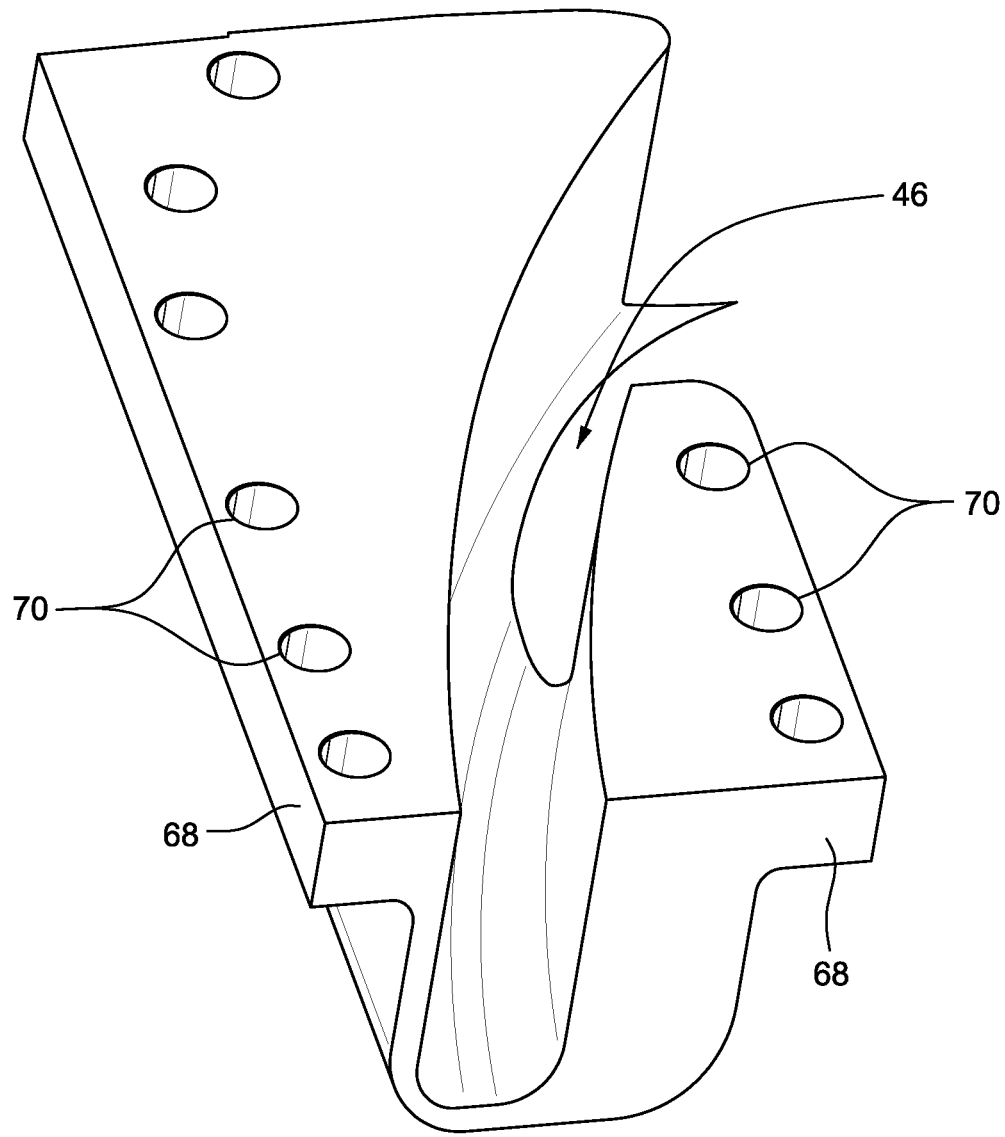
FIGS. 16-19 the installation of another exemplary impeller insert.
Figure 17:
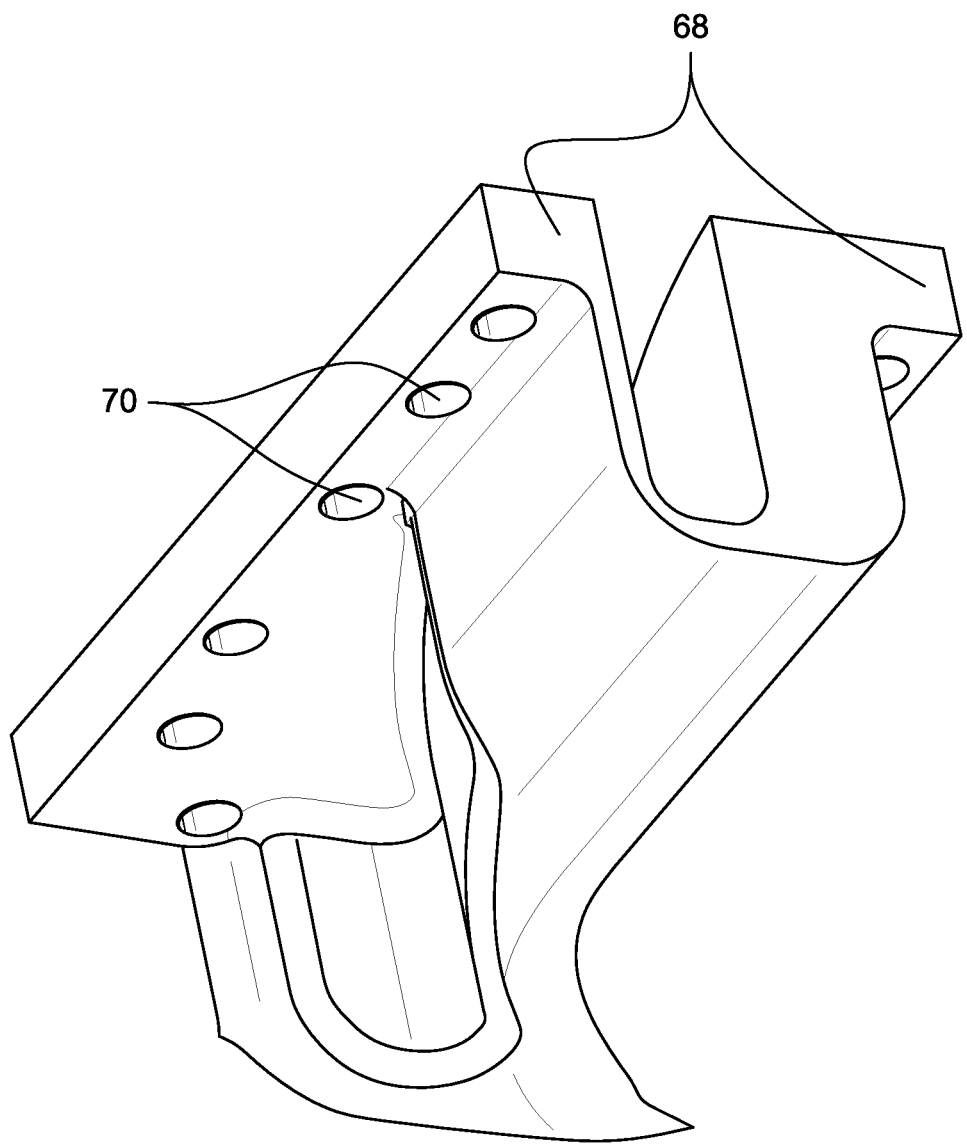
Figure 18:
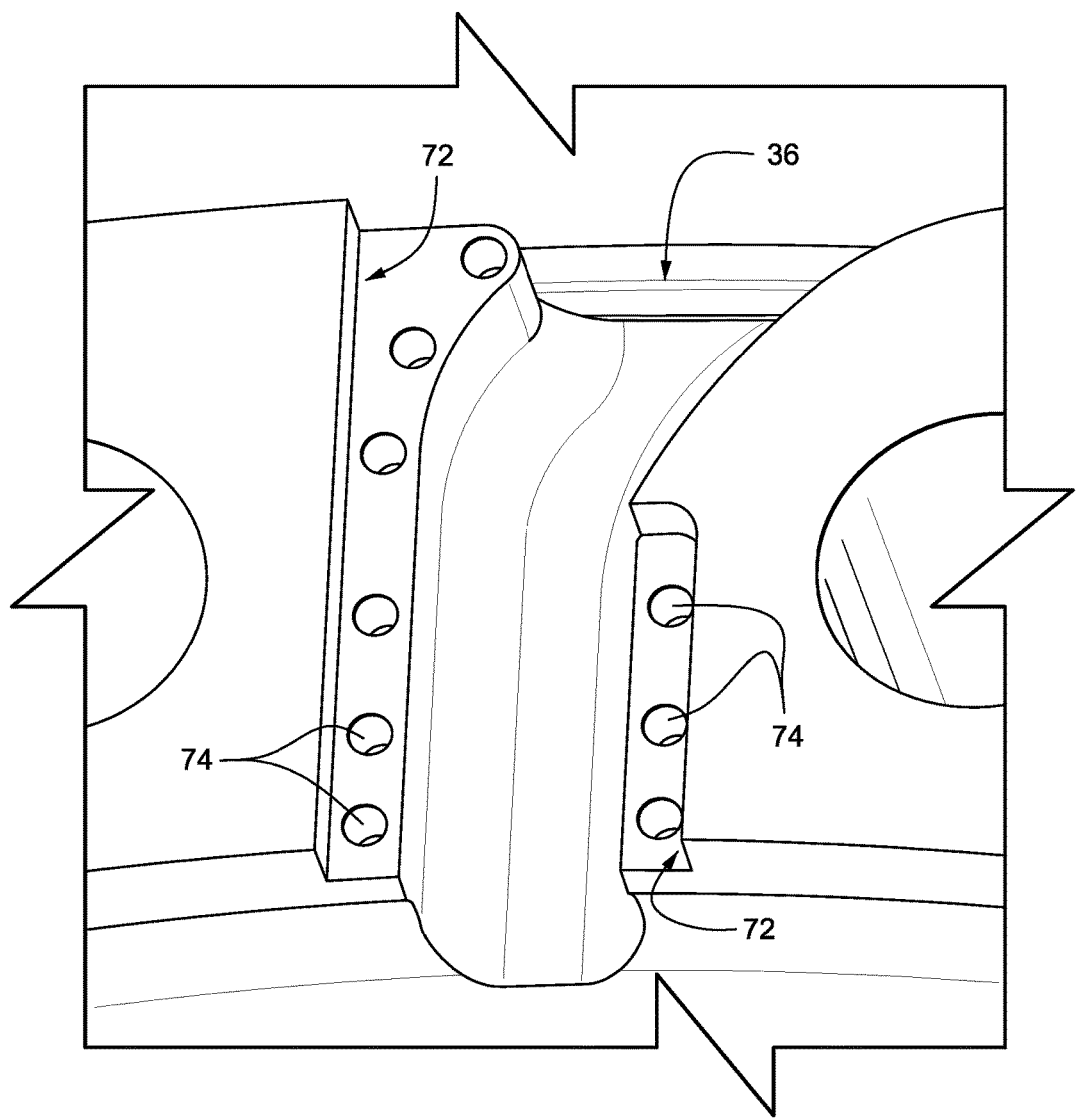

FIGS. 13-15 show process steps for installing an exemplary insert 44. As shown in FIG. 13, an insert 60 is positioned in the fluid passage and tack welded to secure the insert 60 in place. The impeller passage 46 is milled in the insert 60, and a top plate slot 62 is milled in the insert 60. As shown, the insert may be formed with grooves 50 that receive pins 52 to secure the impeller insert 44 in the fluid passage. FIG. 15 shows the fluid passage machined or milled to receive the insert 44. The grooves 66 are cooperable with the grooves 50 in the inserts to secure the inserts in place by the pins 52. As shown in FIG. 14, a top plate 64 is affixed in the top plate slot 62, and the face of the plate is grinded flush with the assembly.

Figure 19:
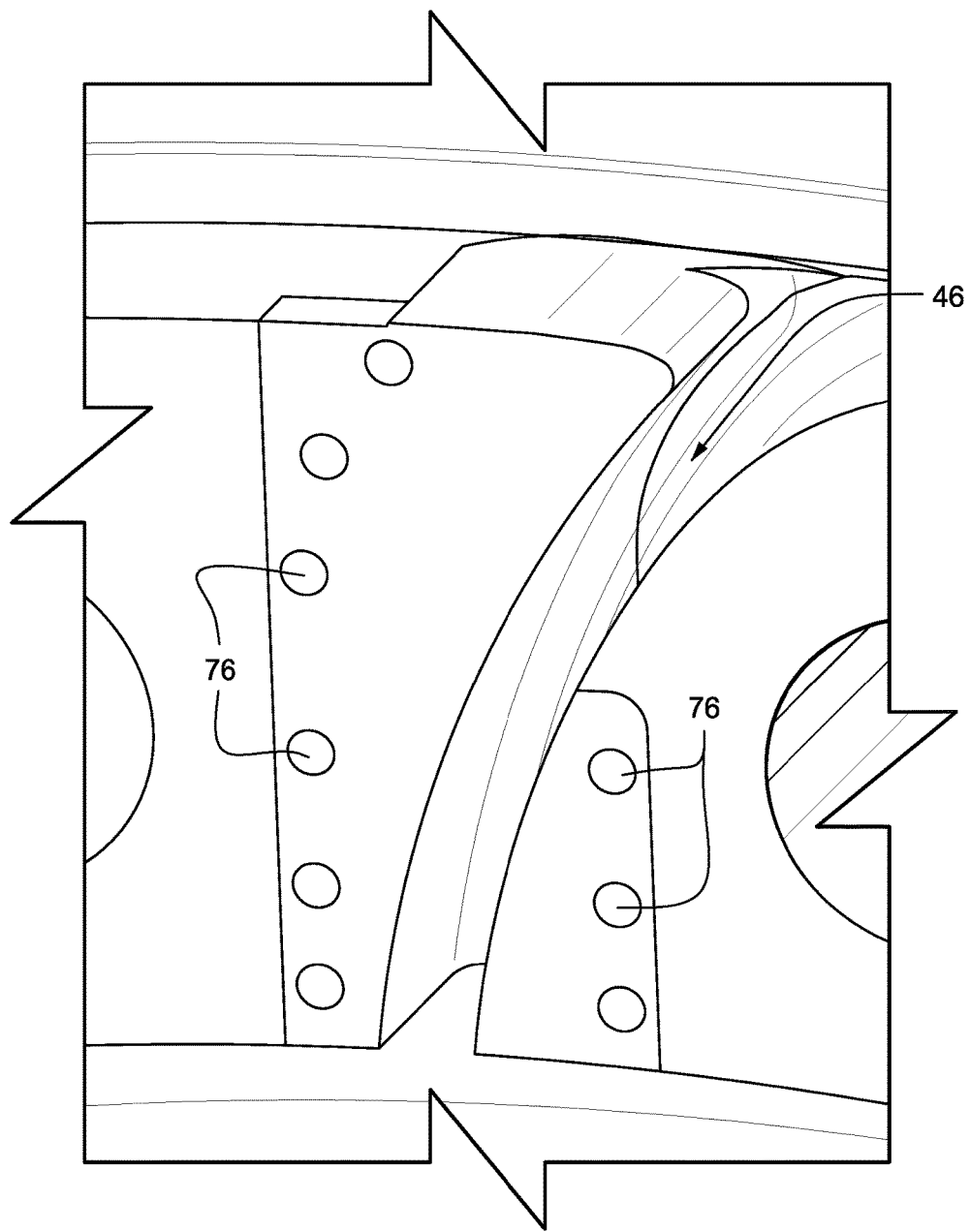

FIGS. 16-19 show the installation of yet another exemplary insert 44. The insert in FIGS. 16-19 includes a preformed impeller passage 46 surrounded by shoulders 68 with connecting apertures 70. The fluid passage/slot 36 in FIG. 13 is machined to include recesses 72 for receiving the shoulders 68, and openings 74 corresponding to the connecting apertures 70 in the insert 44 (see FIG. 18). The insert 44 is placed into the slot 36 and secured with pins 76 as shown in FIG. 19.

Figure 6:
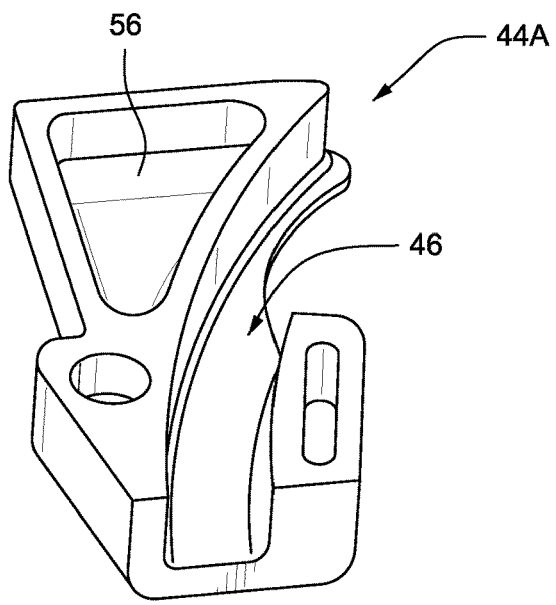
FIGS. 6-11 show top and bottom perspective views of exemplary impeller inserts.
Figure 7:
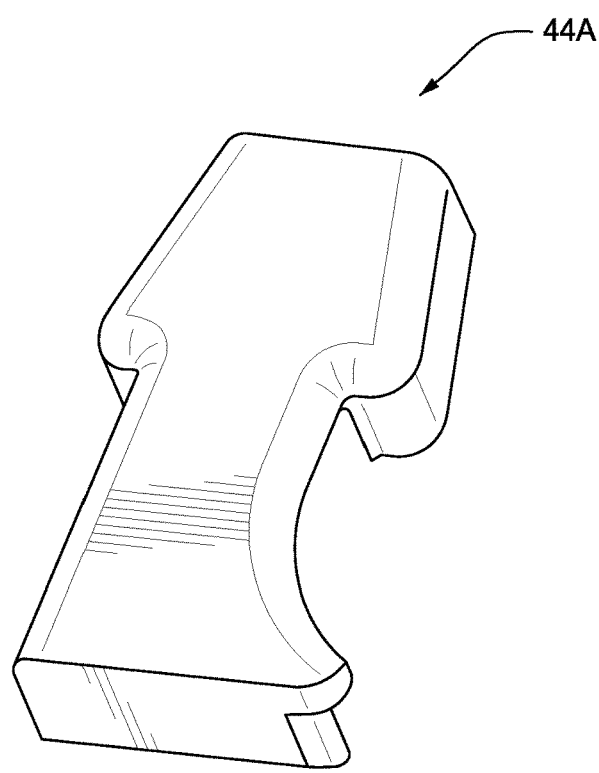
Figure 8:
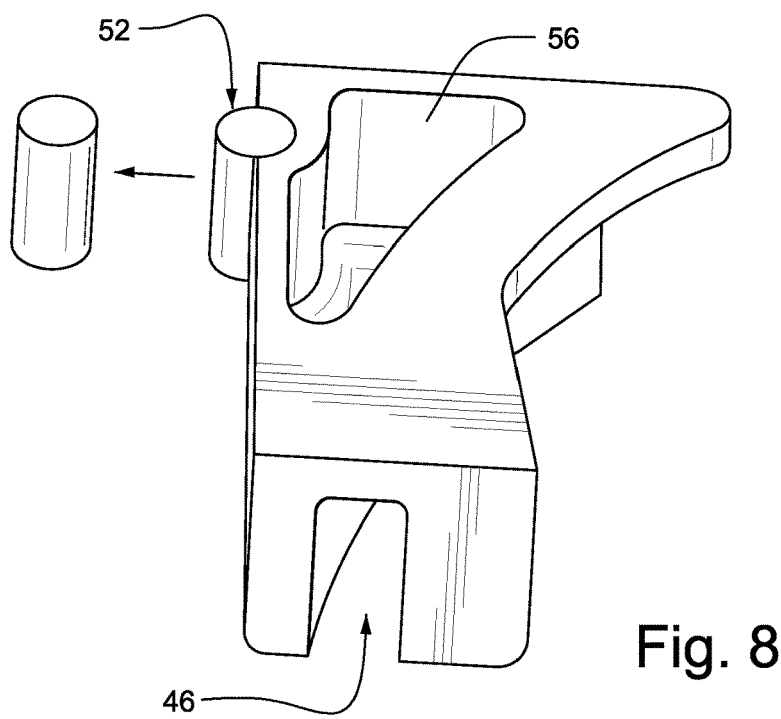
Figure 9:
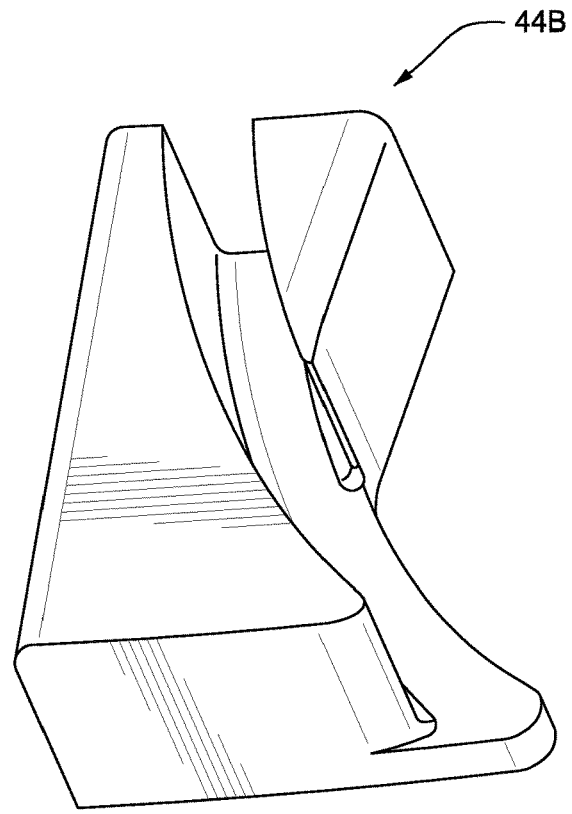
Figure 10:
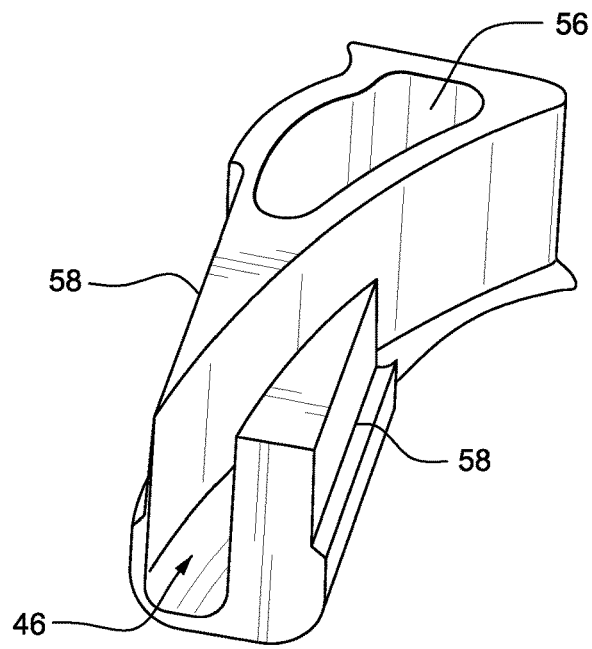
Figure 11:
Figure 20:
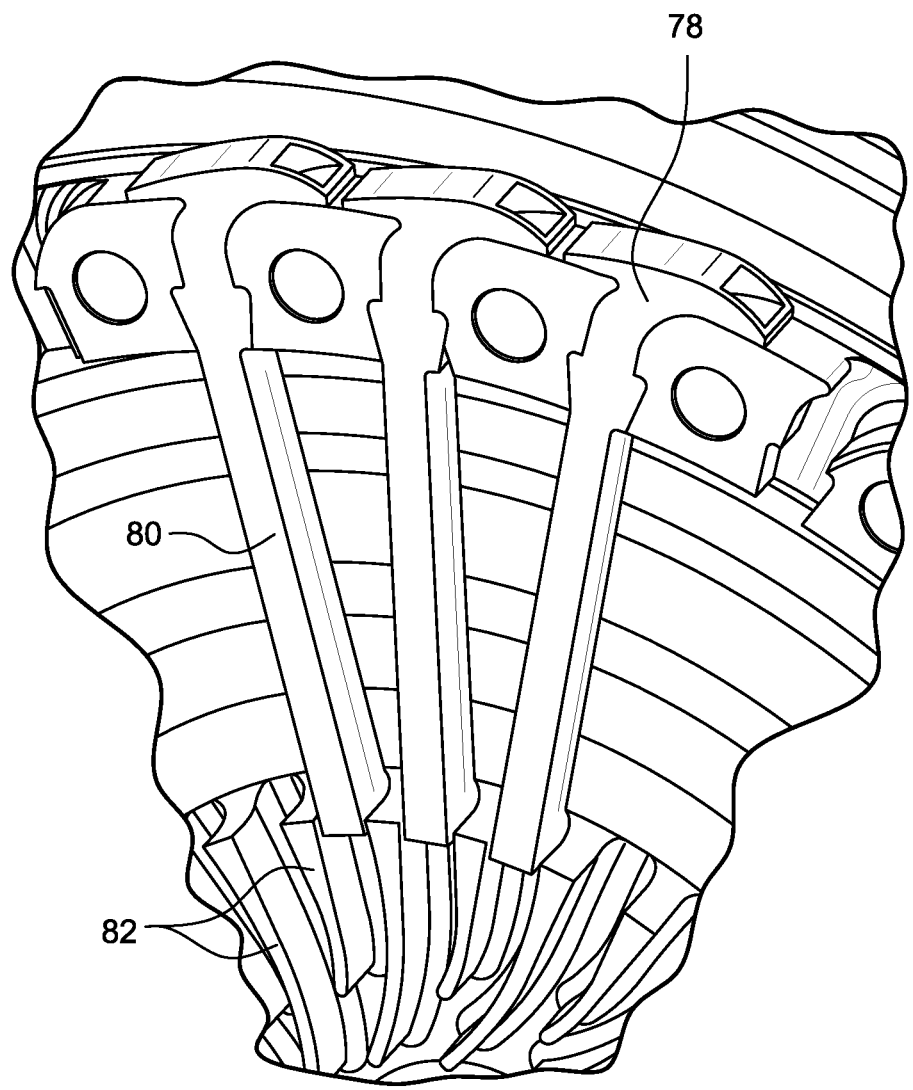
FIGS. 20-21 show an alternative arrangement with air passages extended radially outward and inward.
Figure 21:
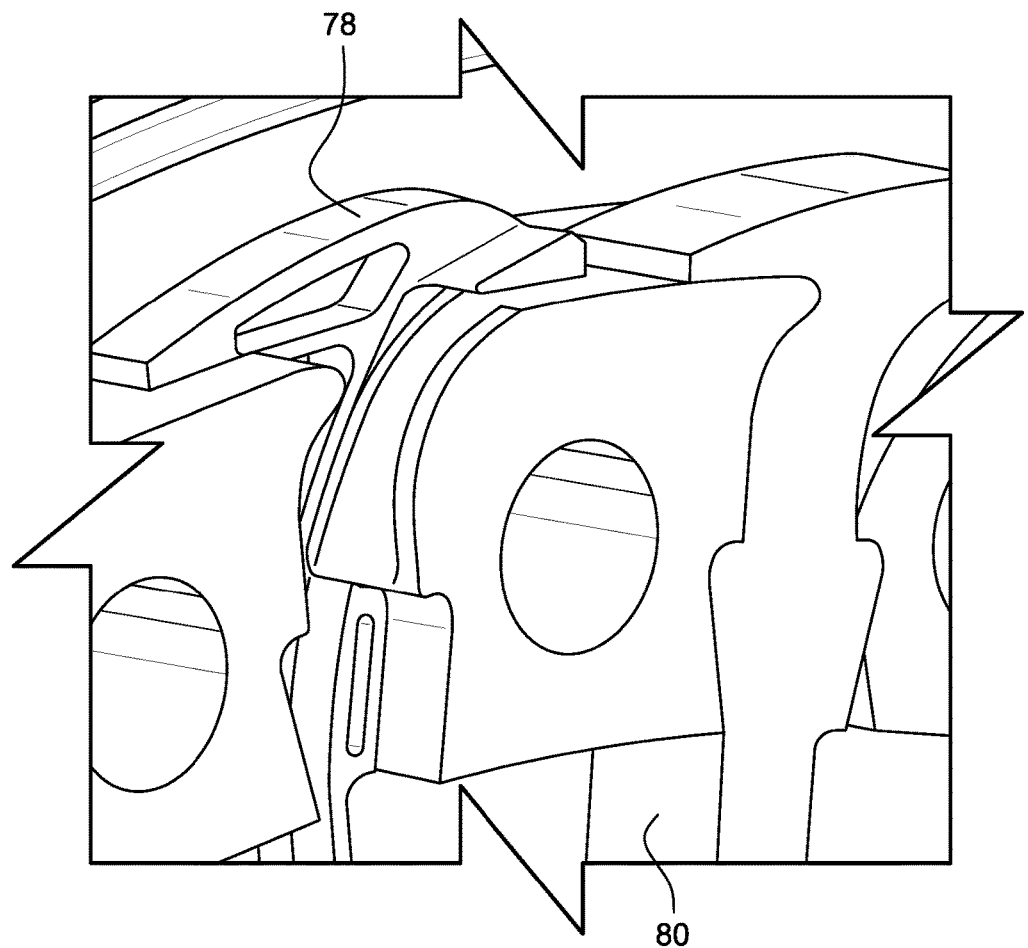

With reference to FIGS. 20-21, the concepts shown in FIGS. 6-7 are modified to extend the air passage (46) radially outward and inward. The outward extension is a scoop 78 that helps turn the air inboard with minimal losses. An inboard extension 80 plumbs the air directly to inboard impellers 82 by forced vortex, which reduces pressure loss and heat pick-up. The concept controls air flow beyond the radial constraints of the flange height.

The impeller inserts simplify the manufacturing process for a rotor wheel as a common or core rotor wheel can be formed with simple fluid passages, while the configuration can be tuned to the flow and pressure as required by utilizing various impeller insert geometries. An existing rotor wheel can be tuned by changing existing impeller inserts for different impeller inserts with alternative geometries. The preferred embodiments also solve the problem of replacing an entire wheel when a change in the impeller flow is required. Additionally, the system may serve to reduce the transient heat into the flange for better flange seating. The system may also reduce transient temperature into the wheel, and reduce thermal conductivity with standoffs.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A rotor wheel for an engine, the rotor wheel comprising:
   a plurality of impeller vanes;
   a plurality of fluid passages defined by adjacent ones of the impeller vanes such that the plurality of fluid passages are radially disposed across at least a portion of the rotor wheel;
   one or more correspondingly shaped impeller inserts disposed within one or more of the plurality of fluid passages, respectively, the one or more impeller inserts defining an impeller passage with a passage shape that controls a flow of fluid through the one or more of the plurality of fluid passages, and wherein the impeller inserts comprise a pocket or hole.

2. A rotor wheel according to claim 1, wherein the impeller passage is narrower than the fluid passages between the adjacent ones of the impeller vanes.

3. A rotor wheel according to claim 2, wherein the impeller passage is formed by milling after installation in the fluid passages.

4. A rotor wheel according to claim 1, wherein the impeller inserts are secured in a dovetail in the fluid passages.

5. A rotor wheel according to claim 1, wherein the impeller inserts are secured in the fluid passages by a pin.

6. A rotor wheel according to claim 1, wherein the impeller inserts are secured in the fluid passages by welding.

7. A rotor wheel according to claim 1, wherein the impeller inserts comprise an insert positioned in the fluid passages, the impeller passage milled in the insert, a top plate slot milled in the insert, and a top plate secured in the top plate slot.

8. A rotor wheel according to claim 1, wherein the impeller vanes comprise at least one slot configured to accommodate the one or more impeller inserts.

9. A rotor wheel according to claim 8, wherein the at least one slot comprises an impeller slot machined in one of the adjacent impeller vanes.

10. A rotor wheel according to claim 8, wherein the at least one slot comprises a weld slot defining a space between the one or more impeller inserts and the impeller vanes for receiving a weld material.

11. An impeller insert for a rotor wheel in an engine, wherein the rotor wheel includes a plurality of impeller vanes, adjacent ones of which defining a plurality of fluid passages such that the plurality of fluid passages are radially disposed across at least a portion of the rotor wheel, the impeller insert being correspondingly shaped to fit within one or more of the fluid passages and comprising an impeller passage having a passage shape that controls a flow of fluid through the one or more of the plurality of fluid passages, and wherein the impeller insert comprises a pocket or hole.

12. An impeller insert according to claim 11, comprising an insert positionable in the fluid passages, the impeller passage milled in the insert, a top plate slot milled in the insert, and a top plate secured in the top plate slot.

13. A method of tuning fluid flow across a rotor wheel in an engine, the rotor wheel including a plurality of impeller vanes and a plurality of fluid passages defined by adjacent ones of the impeller vanes such that the plurality of fluid passages are radially disposed across at least a portion of the rotor wheel, the method comprising: positioning one or more correspondingly shaped impeller inserts within one or more of the plurality of fluid passages, respectively; and defining an impeller passage in the impeller inserts with a passage shape that controls a flow of fluid through the one or more of the plurality of fluid passages, and wherein the impeller inserts comprise a pocket or hole.

14. A method according to claim 13, wherein the positioning step comprises securing the impeller inserts, and wherein the defining step comprises milling the impeller passage in the impeller inserts.

15. A method according to claim 14, further comprising, after milling the impeller passage, milling a top plate slot and securing a top plate in the top plate slot.

16. A method according to claim 13, further comprising, before the positioning step, machining the impeller vanes so that the fluid passages for receiving the impeller inserts are at least one of wider and deeper.

17. A method according to claim 13, further comprising, before the positioning step, machining a weld slot in the impeller vanes for receiving a weld material to secure the impeller inserts.

18. A method according to claim 13, further comprising replacing the impeller inserts with alternative impeller inserts having different impeller geometries, thereby modifying or tuning flow and pressure across the rotor wheel.

\* \* \* \* \*